(12) United States Patent
Bahlke

(10) Patent No.: US 10,357,929 B2
(45) Date of Patent: Jul. 23, 2019

(54) DEVICE AND METHOD FOR ADJUSTING THE HEIGHT OF A MOLD OF A TIRE CURING PRESS, AND TIRE CURING PRESS

(71) Applicant: Harburg-Freudenberger Maschinenbau GmbH, Hamburg (DE)

(72) Inventor: Stefan Bahlke, Lüneburg (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 719 days.

(21) Appl. No.: 14/768,551

(22) PCT Filed: Feb. 5, 2014

(86) PCT No.: PCT/DE2014/000048
§ 371 (c)(1),
(2) Date: Aug. 18, 2015

(87) PCT Pub. No.: WO2014/124623
PCT Pub. Date: Aug. 21, 2014

(65) Prior Publication Data
US 2016/0001513 A1 Jan. 7, 2016

(30) Foreign Application Priority Data
Feb. 18, 2013 (DE) .................. 10 2013 002 980

(51) Int. Cl.
*B29D 30/06* (2006.01)
*B29C 43/58* (2006.01)
*B29C 33/30* (2006.01)

(52) U.S. Cl.
CPC .............. *B29D 30/06* (2013.01); *B29C 43/58* (2013.01); *B29D 30/0601* (2013.01); *B29D 30/0603* (2013.01); *B29C 33/30* (2013.01); *B29C 2043/5833* (2013.01)

(58) Field of Classification Search
CPC ............ B29C 2043/5833; B29D 30/06; B29D 30/0601; B29D 30/0603
USPC ........................................................ 264/40.5
See application file for complete search history.

(56) References Cited

U.S. PATENT DOCUMENTS

| | | | |
|---|---|---|---|
| 3,368,239 A | 2/1968 | Wiltshire | |
| 4,964,792 A | 10/1990 | Katayama et al. | |
| 5,820,885 A | 10/1998 | Irie | |
| 2006/0233912 A1* | 10/2006 | Reinhardt | B29C 33/24 425/595 |
| 2011/0086123 A1 | 4/2011 | Bahlke | |

FOREIGN PATENT DOCUMENTS

| | | |
|---|---|---|
| DE | 4434406 A1 | 3/1995 |
| DE | 19817822 A1 | 10/1999 |
| DE | 102009012191 A1 | 9/2009 |

(Continued)

Primary Examiner — Matthew J Daniels
Assistant Examiner — Xue H Liu
(74) Attorney, Agent, or Firm — Lucas & Mercanti, LLP; Klaus P. Stoffel

(57) ABSTRACT

A device and to a method for adjusting the height of a mold of a tire curing press, and to a tire curing press. The mold has at least two mold parts that can be positioned relative to each other. At least two double-acting fluid cylinders and at least one guide element are used. Positions are secured by at least one locking device.

15 Claims, 13 Drawing Sheets

(56) References Cited

FOREIGN PATENT DOCUMENTS

| | | |
|---|---|---|
| EP | 0368297 A2 | 5/1990 |
| EP | 2327523 A1 | 6/2011 |
| JP | S6248514 A | 3/1987 |
| JP | H11114965 A | 4/1999 |
| WO | 2010146554 A1 | 12/2010 |

* cited by examiner

DEVICE AND METHOD FOR ADJUSTING THE HEIGHT OF A MOLD OF A TIRE CURING PRESS, AND TIRE CURING PRESS

The present application is a 371 of International application PCT/DE2014/000048, filed Feb. 5, 2014, which claims priority of DE 10 2013 002 980.5, filed Feb. 18, 2013, the priority of these applications is hereby claimed and these applications are incorporated herein by reference.

BACKGROUND OF THE INVENTION

The invention pertains to a device and a method for adjusting the height of a mold of a tire curing press, in which the mold comprises at least two mold parts positionable relative to each other.

The invention also pertains to a tire curing press with a mold comprising two mold parts positionable relative to each other and provided with a device for adjusting the height of the mold by changing the position of at least one of the mold parts.

According to the prior art, the height of the mold of a tire curing press is adjusted by the use of, for example, a spindle, the external thread of which engages in the internal thread of a nut. A tire curing press typically comprises a frame, and the mold parts are shifted in a vertical direction.

According to the prior art, the height adjustment is often carried out by the use of an electric drive and a gearbox. Thus, according to the prior art, a rotating type of drive is used, and the rotational movement is converted into a linear movement by means of the known principle realized by the engagement between the threaded spindle and the threaded nut. The linear movement of at least one mold part, i.e., of one of the two halves of the mold, which usually consist of a matrix and a patrix or of a matrix and a pressure disk, is necessary so that the clear width of the required opening, which depends on the dimensions of the tire to be produced and thus the height of the mold can be influenced during the tire production process.

Because of the considerable forces which arise during the production of a tire in a mold, the components, especially the mold parts being used, must have extreme dimensional stability. As a rule, this can be achieved only by making these mold parts, i.e., a matrix and a pressure disk, very massive. These components can thus be extremely heavy and very large.

The linear movement of these components by means of spindle-nut arrangements requires dimensions on a similar scale. So that the required forces can be transmitted, the size, thread type, and especially the materials must be selected so that these loads can be withstood. The choice of high-strength materials makes the machining process or the mass forming by rolling normally used to produce the threads on the spindle and in the nut much more difficult. The spindle and the nut thus become extremely labor-intensive and expensive.

Another problem is that, because of the considerable length of the spindle which is unsupported, the mechanical element consisting of the spindle and the nut are highly susceptible to buckling, especially at the end positions of their linear travel, when the unsupported length is at its maximum. This reduces the property to absorb the linear forces which must be taken up along the axis of the spindle.

The use of a spindle and nut inside the tire curing press is not a simple matter either. A threaded spindle and a nut are often difficult to install and to maintain. In addition, continuous lubrication is also required.

An additional problem is that the drive power-producing unit, i.e., the rotating electric drive in most cases, for the spindle-nut assembly must be arranged directly inside the tire curing press. If the width adjustment of the mold halves is provided on top of the upper mold half, as frequently realized in column-type curing presses, then the amount of space thus occupied must be taken into account, and every time the upper mold half is opened or closed, the rotary drive must be moved as well.

SUMMARY OF THE INVENTION

It is therefore the goal of the present invention to create a method and a suitable device which supports a reliable, technically robust, and low-cost adjustment of the height of the mold of a tire curing press.

This goal is achieved according to the invention in that the height of the mold is adjusted by at least two double-acting hydraulic cylinders and at least one guide element, wherein the guide element comprises at least one position-securing function achieved by at least one locking device.

To realize the adjustment of the height of the mold inside the tire curing press in accordance with the stated goal, the height of at least one of the mold halves is adjusted by at least two hydraulic cylinders. As a result of these hydraulically-acting cylinders, it is possible to arrange the drive power-producing units, consisting of pressure and volumetric flow-producing fluid pumps, outside the tire curing press. The pressurized volumetric flow of fluid is introduced into the hydraulic cylinders through feed lines in the known manner to supply the energy input.

The invention combines the hydraulic cylinders for adjusting the height of the mold of a tire curing press with at least one guide element. Hydraulic cylinders are generally adapted to absorb only comparatively weak lateral forces, that is, radial forces. In a tire curing press, considerable radial forces can occur. For this reason, the invention provides at least one guide element, which is preferably attached centrally to the height-adjustable mold half and/or centrally to the hydraulic cylinder arrangement. Because of the at least one guide element, the radial forces do not have to be introduced into the hydraulic cylinders, and damage leading to leakage, for example, is prevented.

The invention also recognizes that the guide element is available to serve a combination of integral functions, which is especially advantageous. In addition to the guide function made possible by the concentric, linearly movable configuration, the guide element is also equipped with at least one locking device.

This at least one locking device makes it possible to fix the entire structural component consisting of essentially the hydraulic cylinders, the mold half, and the guide element attached to the mold half, in position in the direction of linear axial movement. This achieves the result that, after the hydraulic cylinders have adjusted the mold half to the desired height and the locking device has been activated, the pressure to the hydraulic cylinders can be turned off.

This means that the linear forces acting in the axial direction within the press during the tire production process are absorbed by the guide element rather than by the hydraulic cylinders. It is possible according to the invention to provide more than one locking element along the guide element. As a result, it is possible for the fixation in the direction of linear axial movement to be accomplished in several different positions. This makes it possible to achieve a more finely graduated positioning.

In a preferred embodiment, the guide element has a rotationally symmetric configuration; it is preferably configured as a hollow body in the form of a tube. Any shape is conceivable which supports the guide function and makes it possible to provide the locking device.

The invention also recognizes that the guide element is available for an additional, integral function, which is especially advantageous. In addition to the guide function provided by the concentric, linearly movable configuration and in addition to the at least one locking device, the guide element is preferably also configured as a hollow body, especially as a tube. In agreement with general technical knowledge in the field, a tube is defined as a hollow body with practically any desired cross section. This means that it is possible for a linkage to be guided through the center of the guide element and for a holding tool for the green tire to be attached to one end of this linkage. Before and after the heating and manufacturing process, the green tire must be held inside the mold halves both when they are in open position and when they are closed. This means that the invention realizes a guide element with three integral functions.

In one variant embodiment of the invention, the hydraulic system can be configured as an oil-filled hydraulic system. Another possible way of implementing the invention consists in the use of a water-filled hydraulic system. So that the required vulcanization can be achieved, tire curing presses work at very high temperatures of up to 150° C., frequently at temperatures of up to 180° C., within the mold halves. With respect to the height-adjusting device, this means that the device is used in an environment of severe thermal stress. There is a considerable risk of fire, if, because of a defect or a leak, conventional hydraulic oil should escape and ignite on the hot components. Because the solution to this problem, namely, to use incombustible hydraulic oil, is expensive and environmentally harmful, a water-filled hydraulic system is an obvious choice.

To make it easier to achieve the exact positioning of the height of the mold half to be adjusted, the teaching according to the invention provides double-acting hydraulic cylinders, that is, cylinders which can be moved both in and out in a controlled manner. As a result, the height positioning can be achieved as a function of the actuation distance merely by the controlled feed of the fluid without the need for end stops. In addition, it is possible to reduce the tendency of the fluid system to oscillate by the use of appropriate proportional valve technology.

It is necessary to limit an unlimited input of heat into the fluid cylinders via the height-adjustable mold half, because the operating temperatures of the cylinders normally used are in the range of . . . to . . . ° C. (find in the hydraulics catalog and specify), whereas the mold half can reach temperatures of up to . . . ° C. during the operation of the press. For this reason, the at least two hydraulic cylinders for adjusting the height of the mold are not attached directly by their cylinder rods to the mold half, which, in a preferred embodiment, is formed by a pressure plate, but rather they are connected by means of thermally insulated plates, which prevent the heat transferred via the cylinder rods into the cylinders from exceeding the allowable limits. Because of the high compressive strength which is required, ceramic-based composite materials are especially suitable.

These thermally insulated plates, furthermore, can realize the connection between the cylinder rods and the mold half in such a way that a limited radial relative movement between the cylinder rod attachment point and the mold half is supported. This radial movement prevents the components from twisting relative to each other as a result of tolerance-related, nonuniform movements of the cylinders, manufacturing tolerances, and above all different degrees of material expansion resulting from the prevailing temperature gradients within the tire curing press.

As in the case of the hydraulic cylinders, the guide element is also attached to the mold half by way of a thermally insulated element because of the considerable temperatures which are reached. The purpose of thermally insulating the mold half from the guide element is to reduce the heat input into the guide element and the adjacent components. As in the case of the hydraulic cylinders, it is also important to limit the heat input to the guide element. This is important for the guide element because, to ensure that it can perform its task properly, the guide element must be capable of providing very precise linear guidance in the axial direction. This linear guidance can be realized by various known mechanical elements. Sliding fits, bushings, or roller bearings are suitable ways of achieving this. All of the useful configurations of this linear guidance, however, are sensitive to the material expansion caused by the high temperatures. For this reason, the heat input into the guide element must be limited.

This thermally insulating element between the mold half and the guide element can be configured as a plate or, in adaptation to the cross-sectional form of the guide element, as a ring, for example. In contrast to the insulating elements between the mold half and the hydraulic cylinders, no freedom of radial movement is provided. This would negatively affect the axial guidance function of the guide element. The guide element should absorb the radial forces which could be transmitted by the mold half to the hydraulic cylinders. For this reason, a frictional and/or positive-locking connection must be provided both in the radial direction and in the axial direction between the guide element and the mold half.

In principle, the adjustment of the height of the mold of a tire curing press can be realized by the axial displacement of the upper, of the lower, or of both mold halves. From a cost viewpoint, however, it is recommended that the adjustment be achieved only by the axial displacement of one mold half. Because the upper mold half must often be raised and lowered for the purpose of loading and unloading the press, it is logical to place the adjustment device in such a way that the lower mold half can be adjusted. In this case, it is especially advantageous for the machine bed of the tire curing press, also called the "stand", to be configured as a base for the at least two hydraulic cylinders and/or as a base for the guide element. In this way, both the cost of the overall tire curing press and its height can be reduced.

The machine bed is preferably made of metal materials or cast iron in the form of a welded structure, a bolted-together structure, or as a casting, which is subjected to machining, welding or plastic forming. So that the hydraulic cylinders and/or the at least one guide element can be accommodated, openings into which these components can be mounted and fastened in place are provided in the machine bed. In addition to the reduction of the overall height of the tire curing press achieved by mounting the hydraulic cylinders and/or the at least one guide element in the stand, it is also possible to eliminate additional mounting means to provide support and act as abutments. This helps to achieve a simple and low-cost configuration.

Exemplary embodiments of the invention are illustrated schematically in the drawings:

BRIEF DESCRIPTION OF THE DRAWING

FIG. 6 also shows a guide element 30, mounted in a structural opening 12, the guide element being provided with at least one longitudinal and transverse groove 41;

FIG. 7 also shows a guide element 30 mounted in the structural opening 12 with at least one locking device 40 and a swivel drive 50;

DETAILED DESCRIPTION OF THE INVENTION

Figure 1:
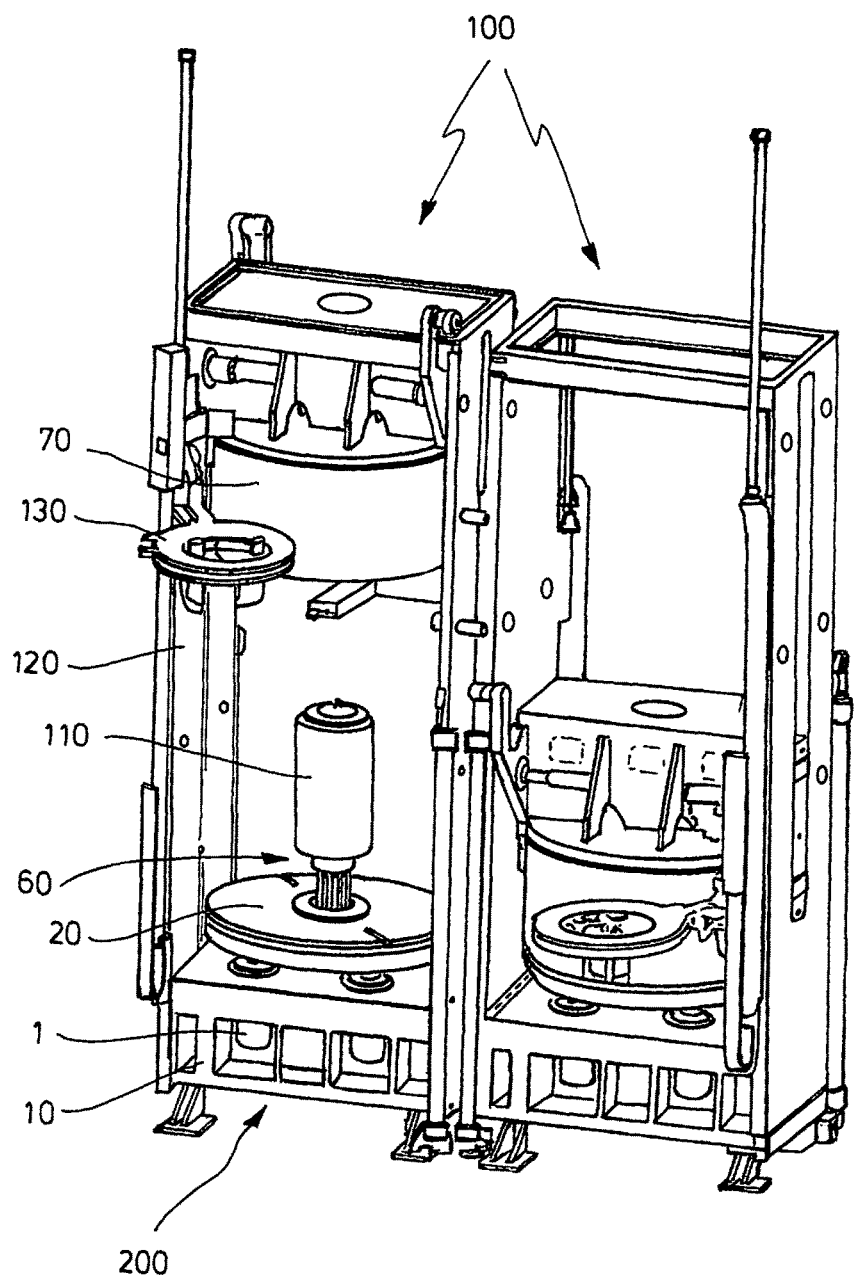
FIG. 1 shows a perspective view of the adjusting device 200 according to the invention for adjusting the height of a mold of a tire curing press 100 consisting by way of example of two adjacent column heating presses, wherein the left tire curing press is in the open position, the right tire curing press in the closed position.

FIG. 1 shows a perspective view of the adjusting device according to the invention for adjusting the height of a mold of a tire curing press 100 based on the example of two column-type heating presses arranged side by side, wherein the left tire curing press is in the open position, the right in the closed position, wherein the upper mold half 70 on the right, which is in the closed position, comprises a cut-away area so that the situation inside the mold halves 20, 70 can be illustrated.

The base of the tire curing press 100 is the machine bed 10, which supports the press structure on top, comprising columns 120 with various mechanical components, either integrated into them or mounted on them, for moving the upper mold half 70 up and down. The lower mold half, here in the form of a pressure plate 20, is arranged directly above the stand 10 and can be moved by hydraulic cylinders 1 in linear fashion in the longitudinal direction of the tire curing press 100.

Projecting from the center of the pressure plate 20 is a holding device 60, comprising a linkage 61 and a holding tool 62 for positioning the green tire 110 inside the mold halves 20, 70.

In an especially preferred embodiment, the movement mechanism for raising and lowering the upper mold half 70 and the cylinders 1 provided for the linear movement of the lower mold half 20 are configured as hydraulic elements. The advantage of the use of hydraulic cylinders 1 for the linear movement of the pressure plate and hydraulic cylinders for the movement mechanism is that a common power unit can be provided. This power unit is usually configured as a hydraulic pump of sufficient capacity. The power and volumetric flow of the hydraulic pump are preferably adjustable.

Figure 2:
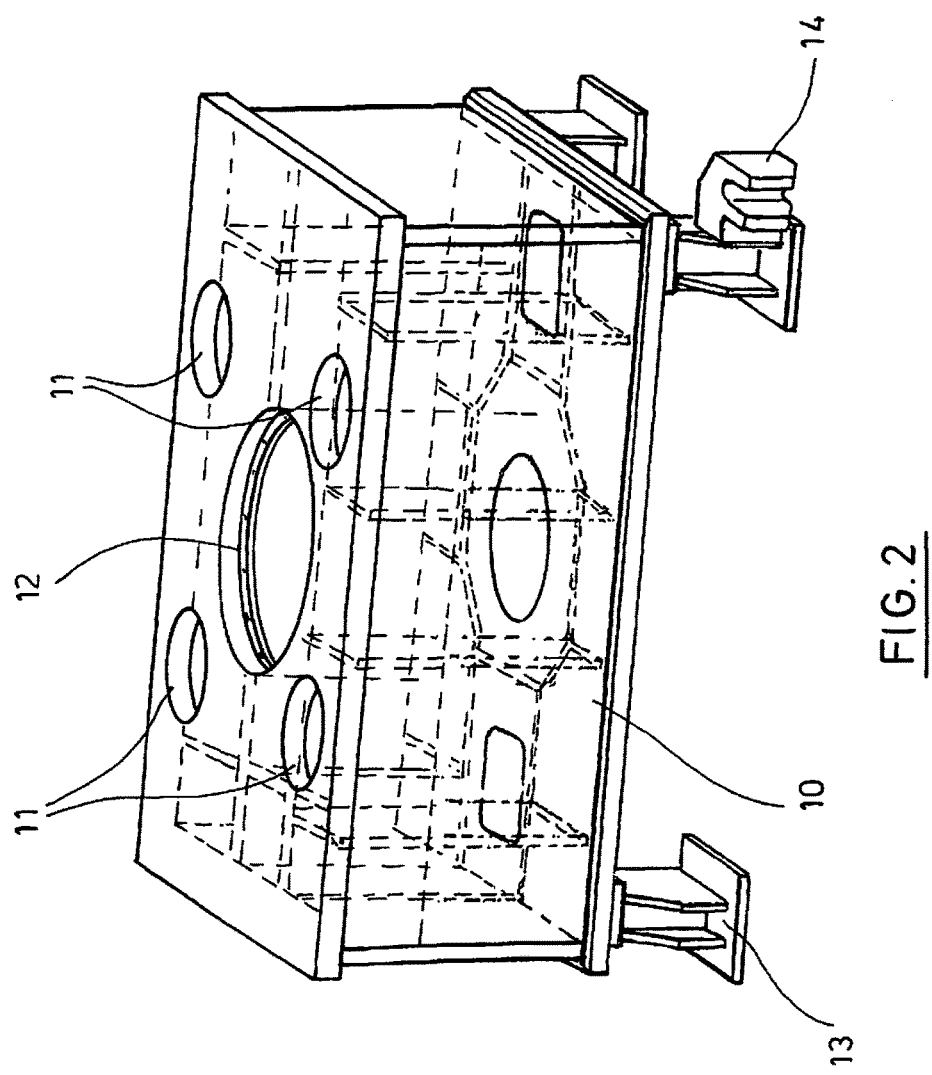
FIG. 2 shows a perspective front view of the machine bed or machine stand 10 of the tire curing press 100.

FIG. 2 shows a front perspective view of the machine bed or machine stand 10 of the tire curing press 100 with double-acting hydraulic cylinders 1. A machine bed 10, also called a stand, is used as the base element of the tire curing press 100 and is equipped with structural openings 11, 12, which serve to accept the hydraulic cylinders 1 and the at least one guide element 30. As a result, the overall height of the tire curing press 100 according to the invention can be reduced.

The machine bed is preferably made of metal materials or cast iron. FIG. 2 shows a configuration as a so-called "built" construction; that is, semi-finished products such as plates, flat steels pieces, and sections corresponding to the dimensions of the stand 10 to be achieved are prefabricated and then assembled by means of threaded bolt connections, riveting, welding, or the like. The overall structure according to the invention is intentionally configured in such a way that almost any production variant of the stand is possible.

Feet 13 are provided, which are intended to be set up on, and attached to, a suitable substrate. The reliable attachment of the machine bed 10 and thus of the entire tire curing press 100 by means of suitable fastening elements is important. When in operation, the tire curing press 100 causes considerable vibrations; both transverse forces and torques occur, which are transmitted by the tire curing press 100 to the surroundings. For this reason, feet 13 are provided in the present example. It is also possible that the stand 10 could be connected directly to the substrate. In another possible embodiment, the feet 13 are provided with additional fastening elements 14 so that they can be connected to another machine bed 10.

Figure 3:
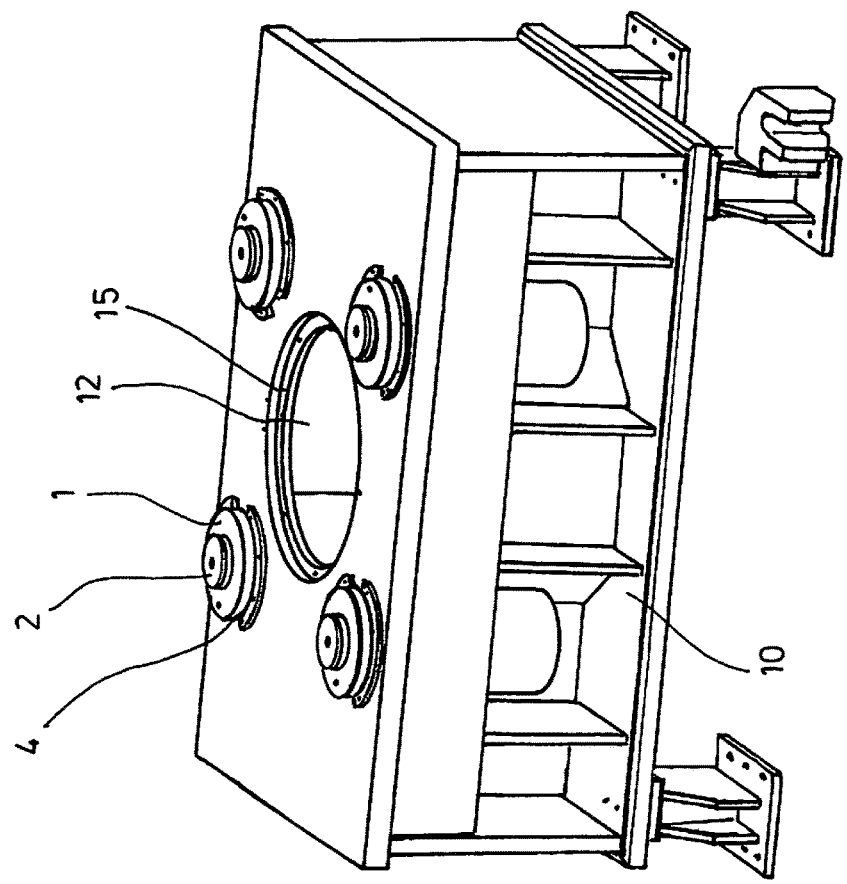
FIG. 3 shows a perspective front view of the machine bed or machine stand 10 of the tire curing press 100 with the mounted hydraulic cylinders 1, wherein the piston rods 2 of the hydraulic cylinders are shown in the retracted end position.

FIG. 3 shows a perspective front view of the machine bed or machine stand 10 of the tire curing press 100 with the mounted hydraulic cylinders 1, wherein the piston rods 2 of the hydraulic cylinders are shown in the retracted end position. In this embodiment, the hydraulic cylinders 1 project beyond the nearly flat surface of the machine be 10. If the height of the tire curing press 100 is to be reduced even further, assembly methods can also be selected in which the hydraulic cylinders 1, when in the retracted position, are plan-parallel to the surface of the stand 10. Connecting means 4 are provided to fasten the hydraulic cylinders 1 in the structural openings 11 of the machine bed 10. The structural opening 12 serves to accommodate the guide element 30 and can also comprise a concentric recess 15.

If a bushing 31 is selected to guide the guide element 30 in the machine bed 10, the concentric recess 15 serves as a receiving space for the collar of the bushing 31. In this illustration, double-acting hydraulic cylinders 1 are used. Each cylinder is typically adapted to generate a force of 125 tons. The tire curing press 100 is thus able to develop a closing force of more than 500 tons.

Figure 4:
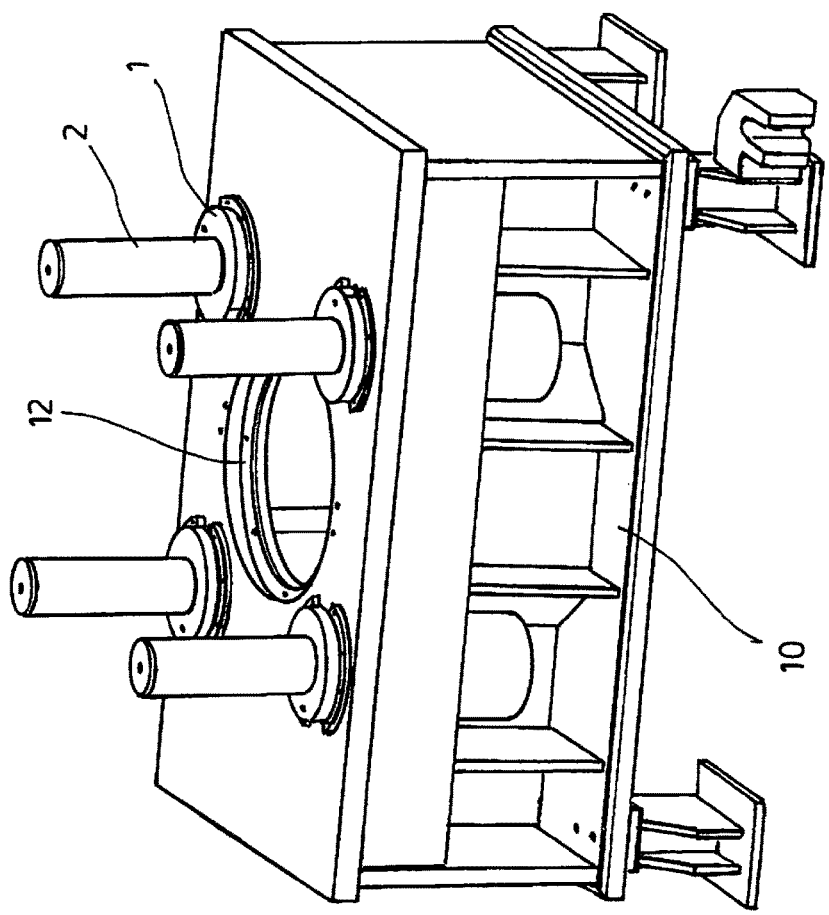
FIG. 4 shows a perspective front view of the machine bed or machine stand 10 of the tire curing press 100 with the mounted hydraulic cylinders 1, wherein the piston rods 2 of the hydraulic cylinders 1 are shown in the extended position.

FIG. 4 shows a perspective front view of the machine bed or machine stand 10 of the tire curing press 100 with the mounted hydraulic cylinders 1, wherein the piston rods 2 of the hydraulic cylinders 1 are shown in the extended position. A typical extension height is 420 mm. The layout is based on a minimum height of 250 mm for the mold halves 20, 70 and on a maximum height of 660 mm for the mold halves 20, 70. The distance by which the cylinder pistons 2 are extended can be preset as a function of the specific application.

Figure 5:
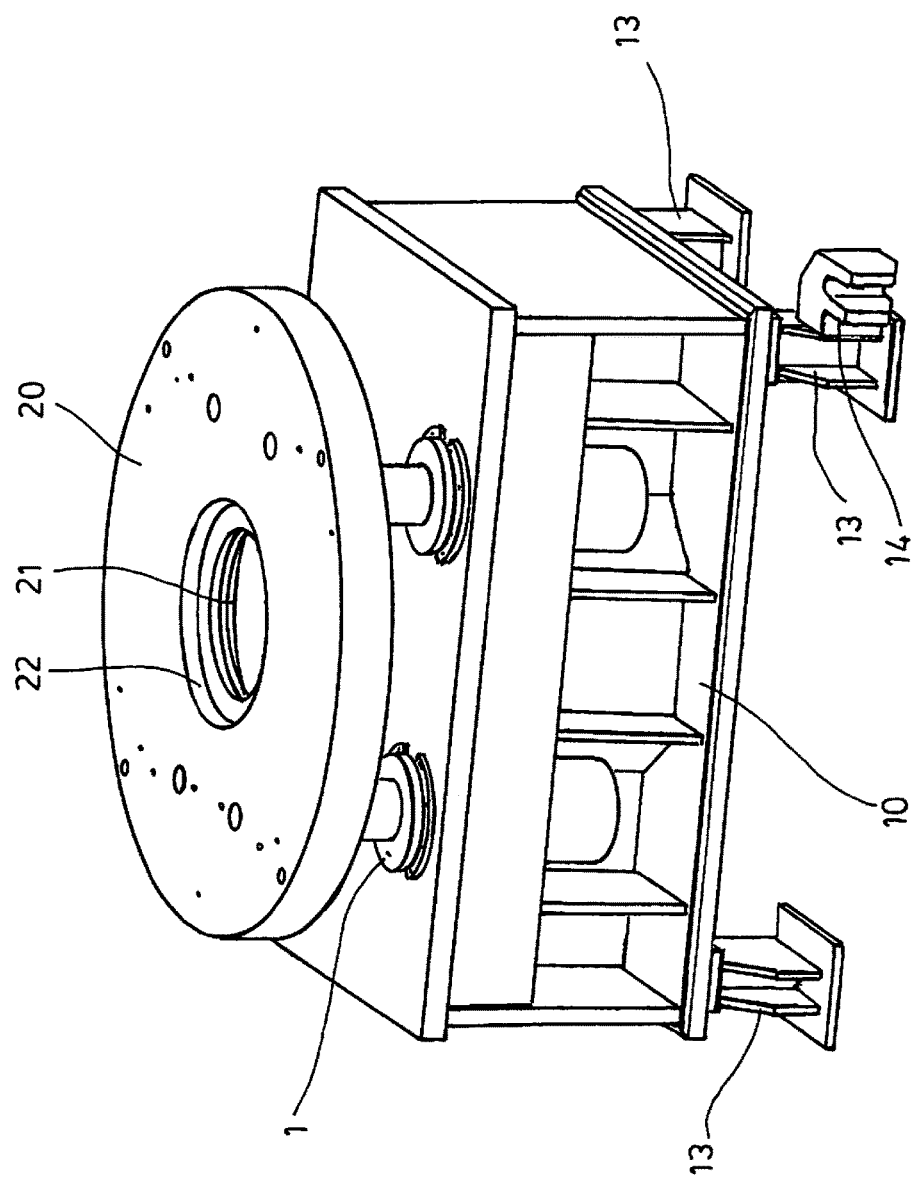
FIG. 5 shows a perspective front view of the machine bed or machine stand 10 of the tire curing press 100 with the mounted hydraulic cylinders 1, wherein the piston rods 2 of the hydraulic cylinders are illustrated in a position different from the retracted position, and wherein the first mold half, shown here as a pressure plate 20, is mounted on the cylinders.
Figure 6:
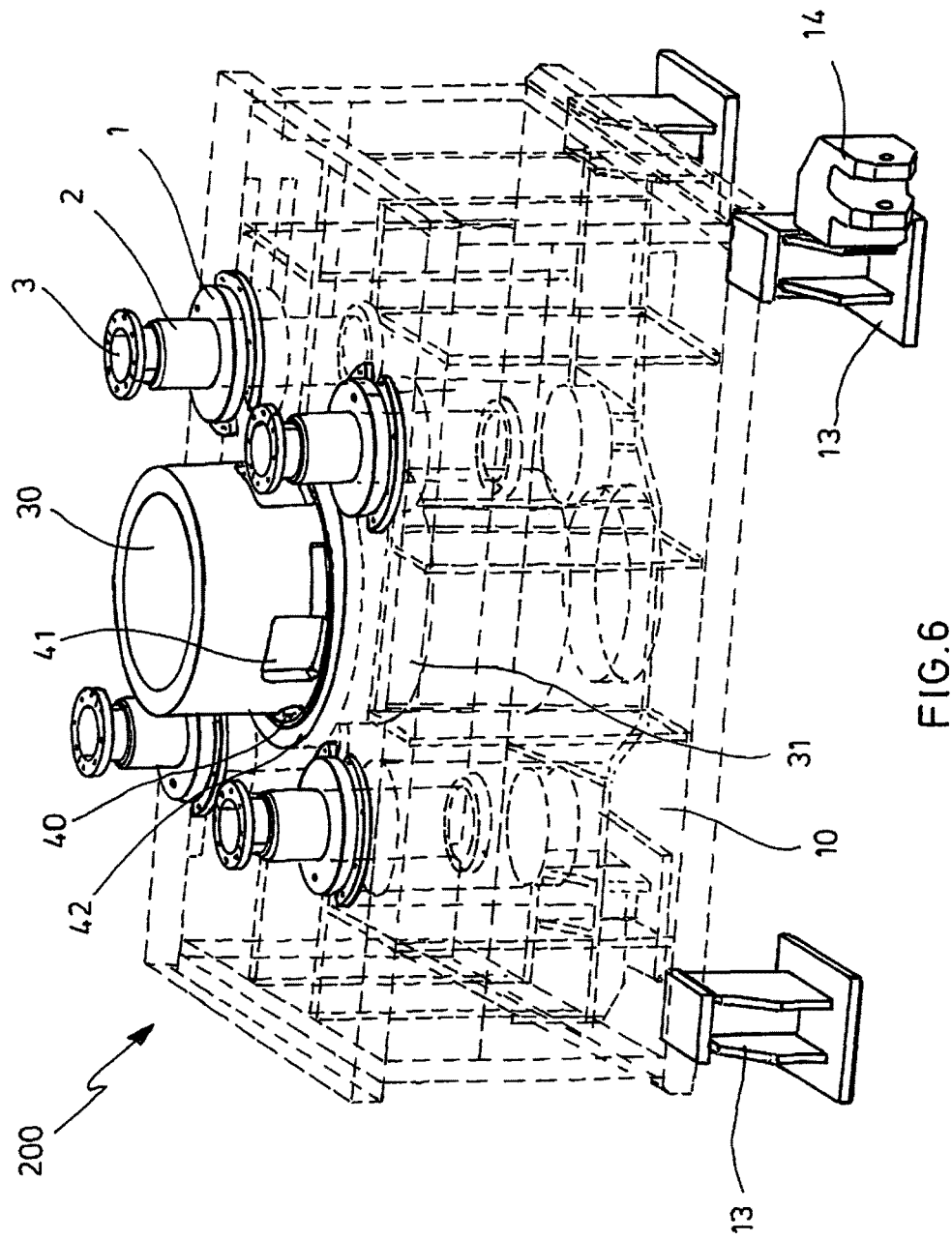
FIG. 6 shows a perspective front view of the adjusting device 200, including the machine bed or machine stand 10 of the tire curing press 100 with the mounted hydraulic cylinders 1, wherein the piston rods 2 of the hydraulic cylinders are in a position different from the retracted position, and wherein connecting means 3 are provided at the ends of the rods.

FIGS. 5 and 6 show perspective front views of the machine bed or machine stand 10 of the tire curing press 100 with the mounted hydraulic cylinders 1, wherein the piston rods 2 of the hydraulic cylinders 1 are illustrated in a position different from the retracted position; also shown is the first mold half (in FIG. 5 only) in the form of a pressure plate 20, mounted on the cylinders.

The pressure plate 20 is not connected directly to the piston rods 2 of the hydraulic cylinders 1. Connecting means 3 are provided, with have insulating properties and which also allow transverse movements. This means that the connecting means 3 have the property of allowing relative radial movement between the cylinder piston rods 2 and the pressure plate 20 at their connecting points, and they simultaneously reduce the transfer of heat. The connecting means 3 can be formed by thermally insulating intermediate plates.

Sliding contact is preferably provided between the plate and the cylinders, and they are connected by the use of clamps. This takes into account the occurrence of thermal expansion and/or makes it possible to compensate for the presence of irregularities in the dimensions attributable to manufacturing tolerances and for movements of the hydraulic cylinders.

FIG. 6 shows a perspective front view of the machine bed or machine stand 10 of the tire curing press 100 with the hydraulic cylinders 1 mounted on it, wherein the piston rods 2 of the hydraulic cylinders are illustrated in a position different from the retracted position, and wherein these piston rods comprise connecting means 3 at their ends. FIG. 6 also shows a guide element 30, which is mounted in the structural opening 12 and which is provided with a locking device 50 with at least one longitudinal groove and transverse groove 41. The guide element 30 is tubular in shape and combines three integral functions: absorption of the linear forces in the axial direction of the tire curing press 100; absorption of the radial forces of the lower mold half 20; and provision of a passage for the holding device 60 through the pressure plate 20 into the press space formed by the two mold halves 20, 70.

The absorption of the linear forces in the axial direction of the tire curing press 100 by the guide element 30 is supported by the provision of a locking device 40 on the guide element 30. The locking element 40 is essentially a disconnectable latch, which holds the guide element 30 in a defined axial position. After the hydraulic cylinders 1 have adjusted the mold half 20 to the desired height and the locking device 40 has been activated, the pressure to the hydraulic cylinders 1 can be turned off. This means that the linear forces acting within the tire curing press 100 in the axial direction of the press during the tire production process do not have to be absorbed by the hydraulic cylinders 1; instead, they are absorbed by the guide element 30.

It is possible according to the invention to provide more than one locking device 40 along the guide element 30. This makes it possible to lock the guide element in several different positions in the direction of linear axial movement. This supports a finely graduated positioning.

The preferred embodiment of the locking device 40 is shown in FIG. 6. It is a bayonet joint, which is formed by the cooperation between at least one longitudinal and transverse groove 41 on the outer cylindrical surface of the guide element 30 and a ring 42 with at least one pin 43. After the guide element 30 has been moved into its axial position and its at least one transverse groove 41 has been aligned with the at least one pin 43, the ring 42 and thus also the at least one pin 43 is turned by a swivel drive 50 until the at least one pin 43 has reached the area of the longitudinal groove 41 of the guide element 30. Thus the principle of the bayonet joint is realized, and the guide element 30 is held in its axial position by the locking device 40.

Figure 9:
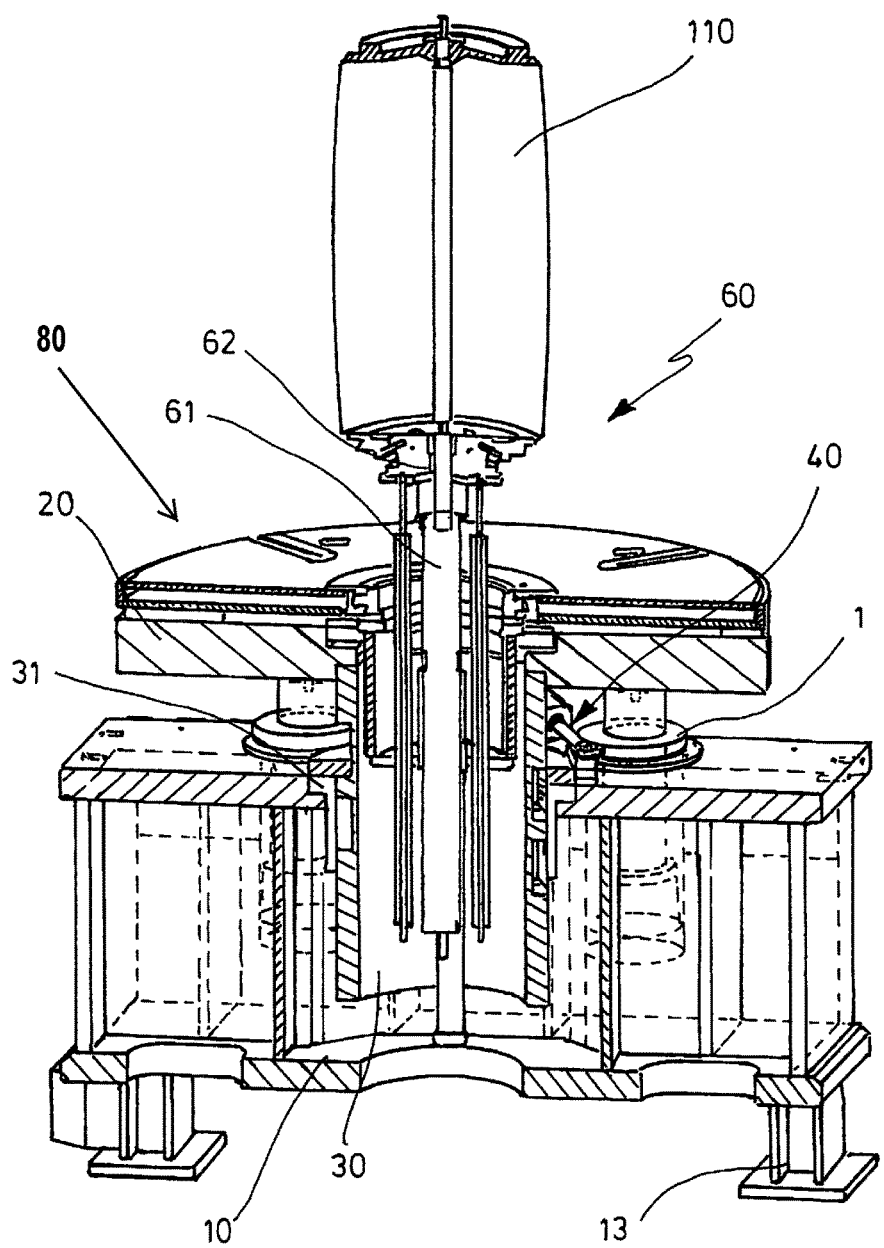
FIG. 9 shows a perspective cross-sectional front view of the lower part of a tire curing press 100, comprising the machine bed or machine stand 10, the mounted hydraulic cylinders 1, and a guide element 30 mounted in the structural opening 12, where the first mold half, here in the form of a pressure plate 20, is attached to the guide element. The linkage 61, which cooperates with the holding tool 62 to form the holding device 60 for the green tire 110, is guided through the center of the tubular guide element 30 and through the opening 21 in the pressure plate 20.
Figure 12:
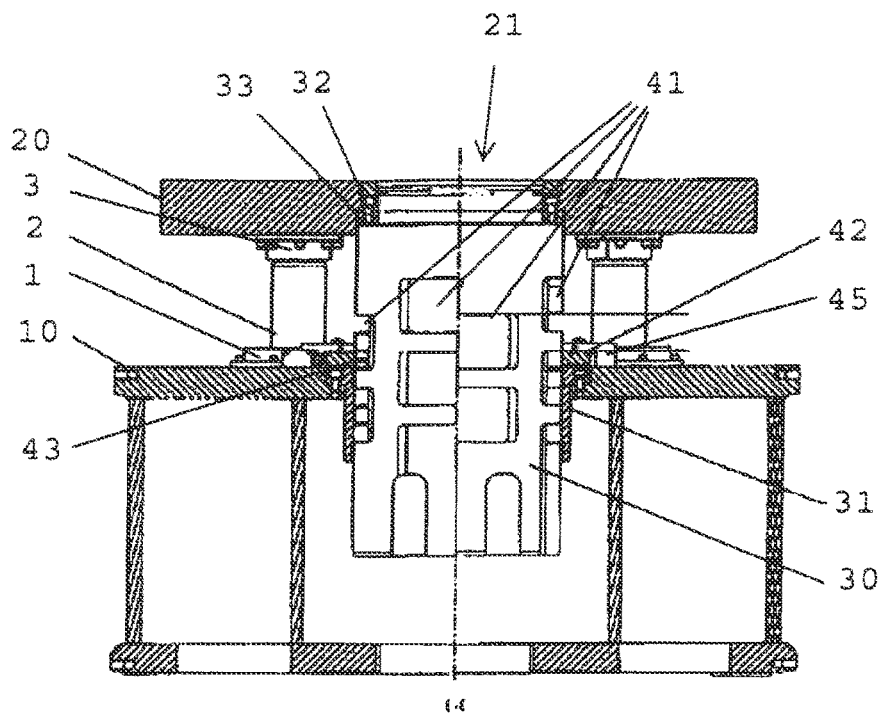
FIG. 12 shows, in the lower part, a top view of the tire curing press 100, including the pressure plate 20 and the opening 21 in the center of the pressure plate 20 with the guide element 30. The upper part shows a cross section along the line C-C of the top view.
Figure 12:
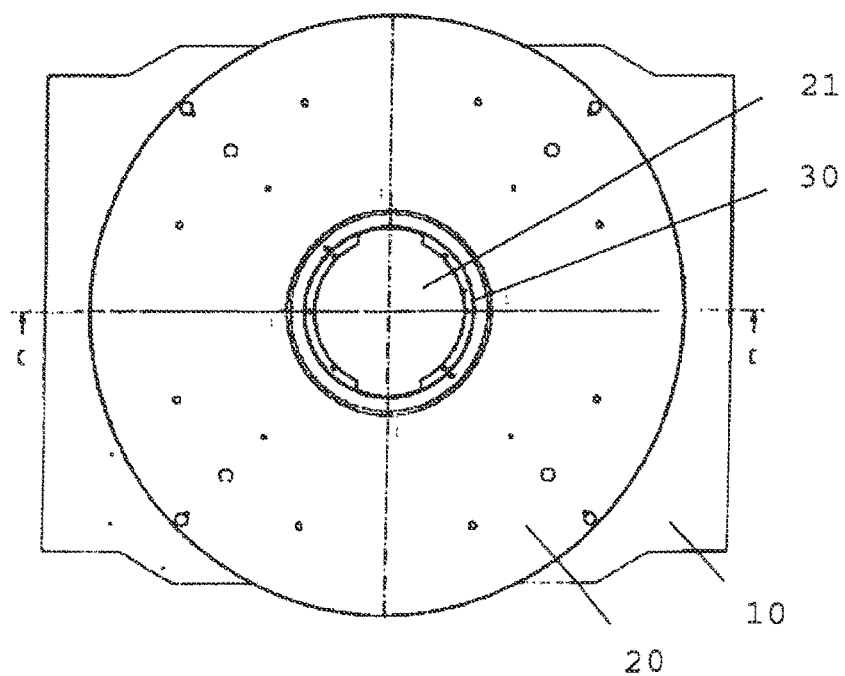

The second integral function of the guide element 30, that is, the absorption of the radial forces of the lower mold half 20, is explained on the basis of FIGS. 9 and 12. The third integral function of the guide element 30, i.e., the passage of the holding device 60 through the pressure plate 20 into the press space formed by the two mold halves 20, 70, is explained on the basis of FIG. 9.

Figure 7:
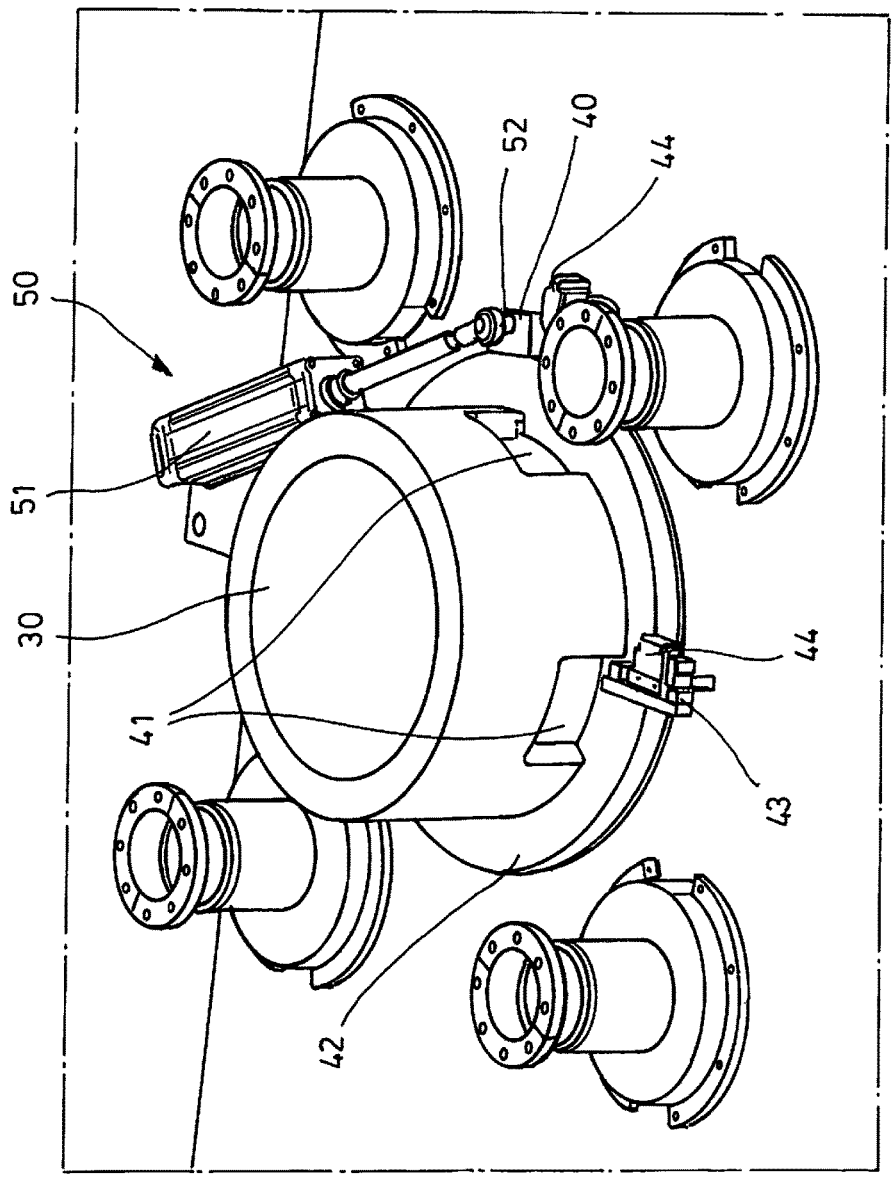
FIG. 7 shows a perspective top view of the machine bed or machine stand 10 of the tire curing press 100 with the mounted hydraulic cylinders 1, wherein the piston rods 2 of the hydraulic cylinders 1 are illustrated in a position different from the retracted position, and wherein connecting means 3 are provided at the ends of the rods.

FIG. 7 shows a perspective top view of the machine base or machine stand 10 of the tire curing press 100 with the hydraulic cylinders 1 mounted thereon, wherein the piston rods 2 of the hydraulic cylinders 1 are illustrated in a position different from the retracted position and comprise connecting means 3 at their ends. FIG. 7 also shows a guide element 30 with at least one locking device 40 and a swivel drive 50 mounted in the structural opening 12. The swivel drive 50 serves to pivot the ring 42 and thus represents a rotary drive for the locking device 40, which is configured here as a bayonet joint.

The ring 42 is pivoted around an arc of a circle, the length of which is coordinated with the size relationships of the at least one longitudinal and transverse groove 41 and of the at least one pin 43. The swiveling drive cylinder 51 is attached to the ring 42 by movable connecting means 52. Sensors 44 are used to detect the rotational position of the ring 42. If the ring 42 is not in the locking position, this is reported to a control unit, possibly to the central control unit. In this state, the tire curing press 100 cannot be closed.

Figure 8:
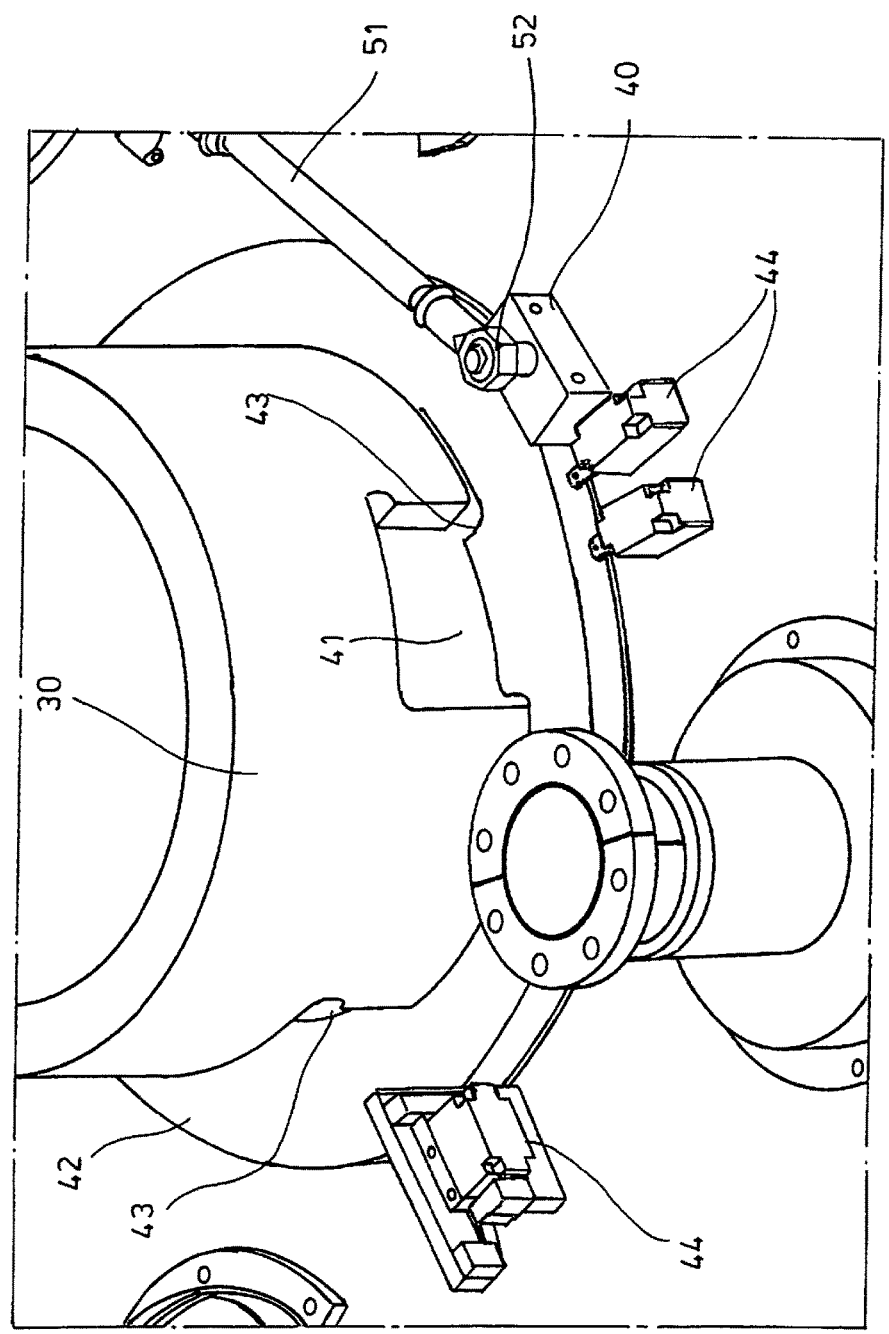
FIG. 8 shows a perspective partial top view of the machine bed or machine stand 10 of the tire curing press 100 of FIG. 7, in particular a view of the guide element mounted in the structural opening 12 with at least one locking device 40 and the swivel drive 50.

FIG. 8 shows a part of a perspective top view of the machine bed or machine stand 10 of the tire curing press 100 of FIG. 7; in particular, a guide element 30 with at least one locking device 40 and a swivel drive 50 as already illustrated and explained on the basis of FIG. 7 are shown.

FIG. 9 shows a perspective cross-sectional front view of the lower part of a tire curing press 100 comprising the machine bed or machine stand 10 and the hydraulic cylinders 1 mounted thereon and a guide element 30 mounted in the structural opening 12. The guide element 30 is preferably arranged centrally with respect to the four hydraulic cylinders 1. By the use of the guide element 30, it is possible to center the pressure plate 20. The first mold half, shown here as a pressure plate 20, is attached to the guide element 30 and is thus axially positionable. This attachment is realized in that both a friction-locking connection and a positive-locking connection are present in the radial and axial directions. As a result, the radial forces introduced into the pressure plate 20 by the guide element 30 are absorbed. The guide element is supported by way of a bushing 31 against the machine bed 10. In this way, the second integral function of the guide element 30, that is, the absorption of the radial forces of the lower mold half 20, is realized.

The linkage 61, which, together with the holding tool 62, forms the holding device 60 for the green tire 110, is guided centrally through the tubular guide element 30 and the opening 21 in the pressure plate 20. The tire curing press can be dimensioned for the production of car tires or truck tires.

The way in which the tire curing press 100 operates can be described on the basis of FIGS. 9 and 1 as follows.

First, the lower mold half, i.e., the pressure plate 20, is moved into position by the adjusting device 200 according to the invention. The adjusting device 200 is formed essentially by at least two hydraulic cylinders 1 for positioning the lower mold half 20 in the longitudinal direction of the tire curing press 100 and at least one guide element 30. After the pressure plate 20 has reached the desired position, a locking device 40 is activated, so that the pressure plate 20 connected to the guide device 30 is locked in position.

After the hydraulic cylinders 1 have moved the mold half 20 to the desired height and the locking device 40 has been activated, the pressure to the hydraulic cylinders 1 can be turned off. The green tire 110 is positioned in the longitudinal direction of the tire curing press 100 by a holding device 60.

By the use of the movement mechanism integrated into the columns 120, the upper mold half 70 is lowered into a pressing position. Then the tire curing process is carried out; that is, the tire is produced under the action of heat and pressure for a certain production time. The green tire 110 is formed out a large number of components such as two beads, rubber blends, reinforcing fabric, and steel belts.

The components of the green tire 110 are vulcanized together for a period of 10-30 minutes at a temperature of over 150° C. by the tire curing press 100 according to the invention with adjusting device 200. Upon completion of the production process, the tire curing press 100 is opened by the movement mechanism integrated into the columns 120, which moves the upper mold half 70 into an opened position, and the finished tire can be removed from the holding device 60 by a removing device.

Figure 10:
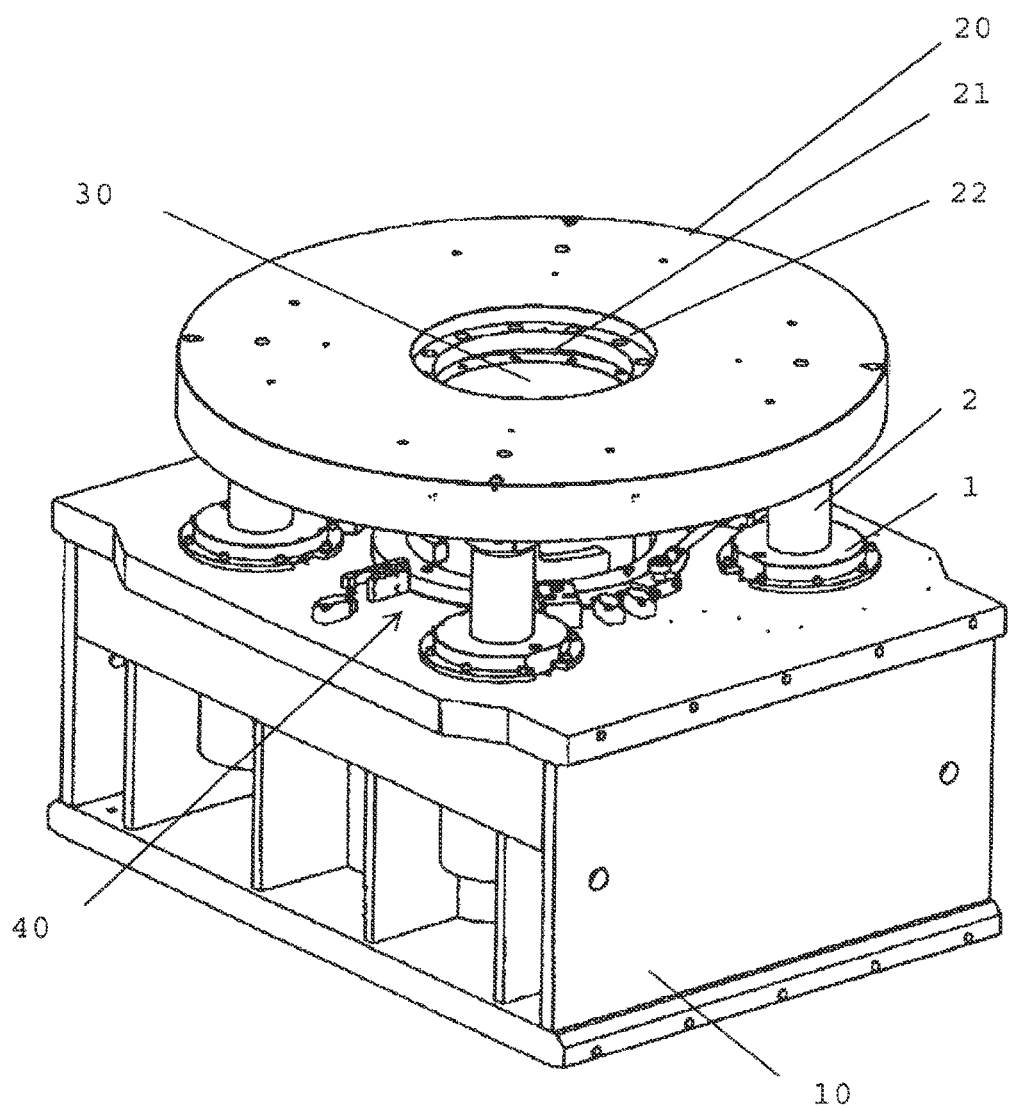
FIG. 10 shows a perspective side view of the components of FIG. 5, minus the feet 13 of the machine bed 10.

For the sake of illustration, FIG. 10 shows a perspective drawing from the side, similar to the view of FIG. 5, but without the feet 13 of the machine bed 10. In this drawing, the connecting means 32 of the guide element 30 are not shown, so that the concentric recess 22 in the pressure plate 20 can be seen.

Figure 11:
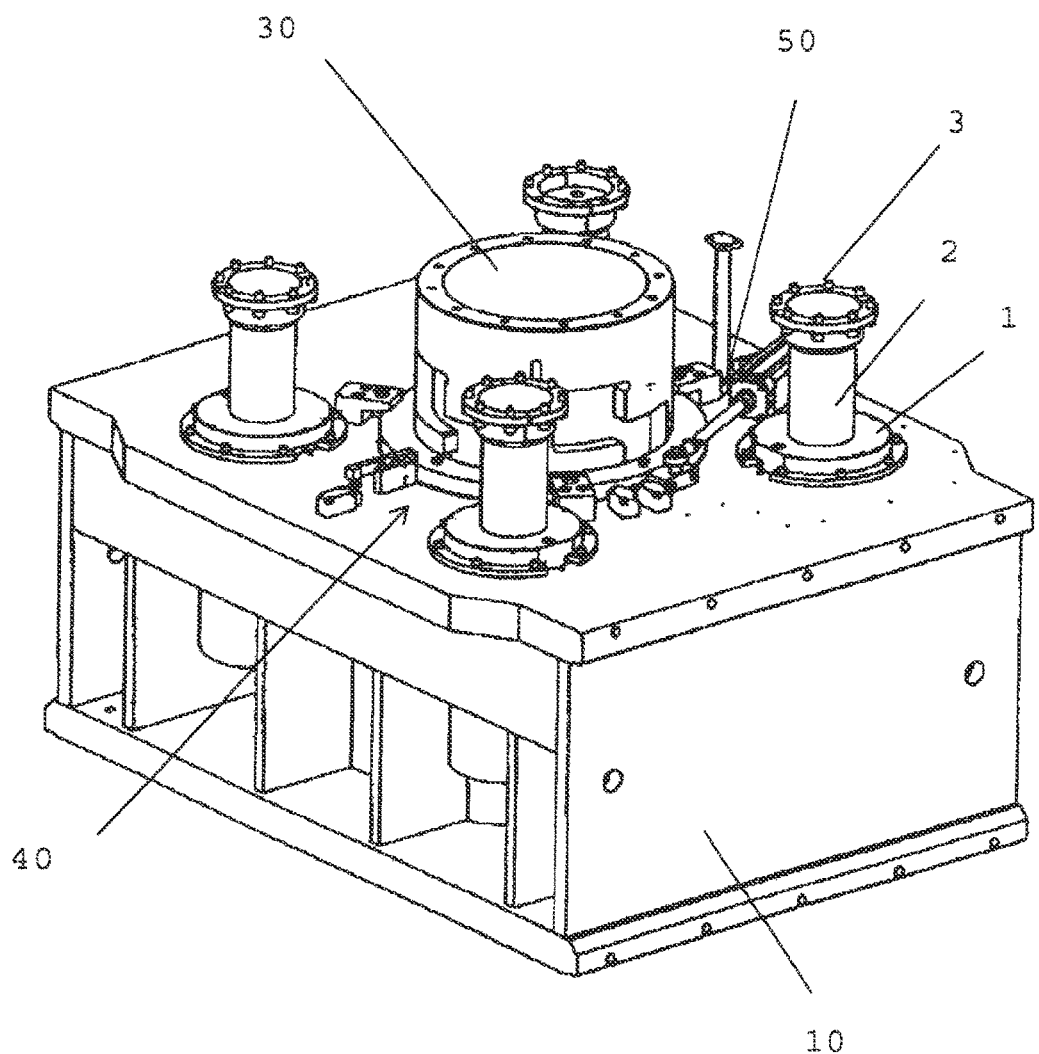
FIG. 11 shows a perspective side view of the components of FIGS. 6 and 7, minus the feet 13 of the machine bed 10.

For the sake of illustration, FIG. 11 shows a perspective drawing from the side, similar to the views of Figures and 6 and 7, but without the feet 13 of the machine bed 10.

The lower part of FIG. 12 shows a top view of the tire curing press 100; the pressure plate 20 and the opening 21 with guide element 30 arranged centrally with respect to the pressure plate 20 can be seen. The upper part of the figure is a cross-sectional view along line C-C of the top view. In these drawings, several longitudinal and transverse grooves 41 can be seen, both around the circumference of the cylindrical surface and in the longitudinal direction of the guide element 39. By way of the bushing 31, the guide element 30 is supported against the machine bed 10, and at the same time movement in the axial direction is made possible.

Thanks to the central bore 33 in the pressure plate 20 and the connecting means 32 for connecting the guide element 30 to the pressure plate 20, it is possible for the two components to be centered with respect to each other and for the radial forces of the pressure plate 20 to be absorbed by the guide element 30.

Figure 13:
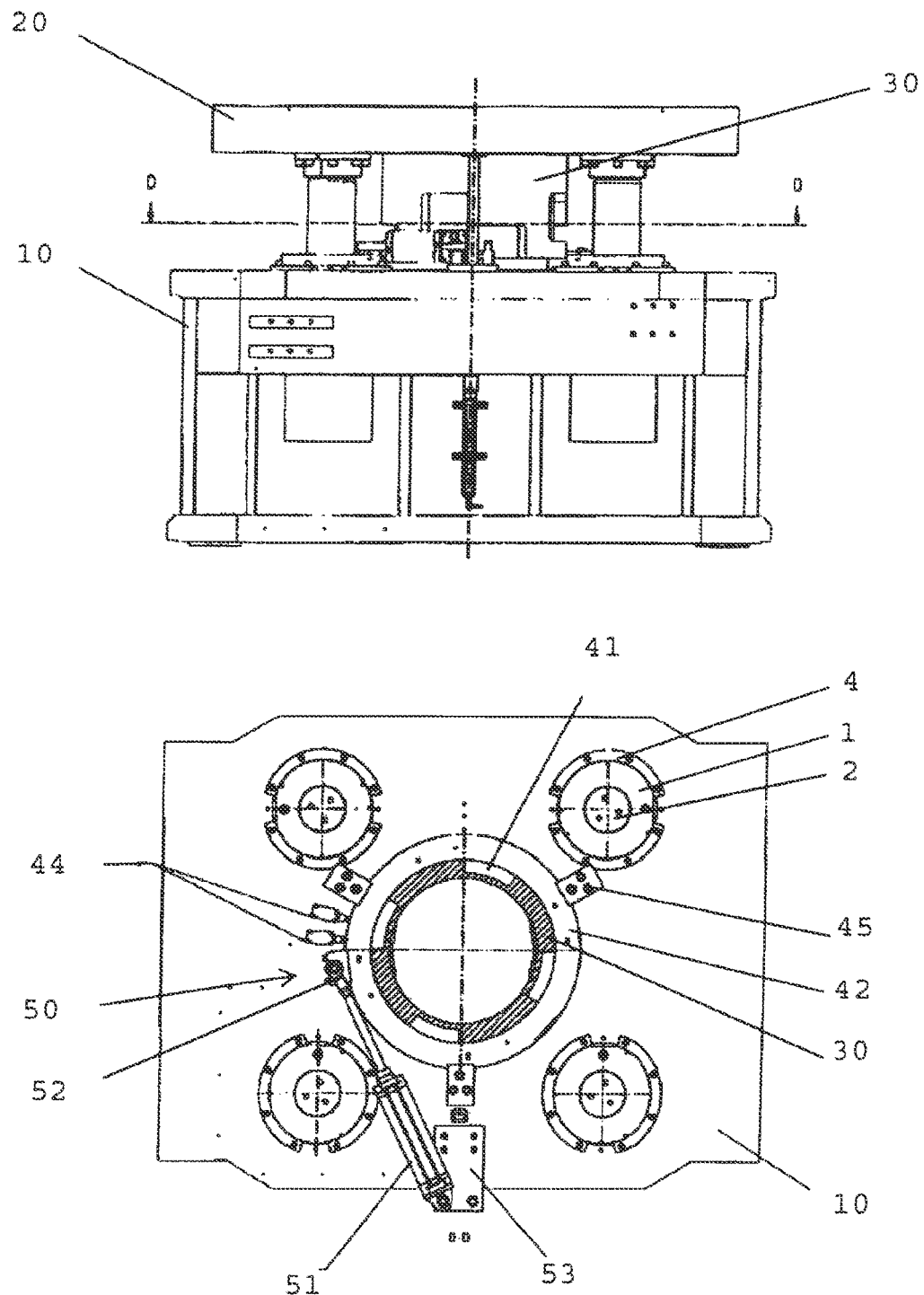
FIG. 13 shows a front view of the lower press area of the tire curing press 100 with the stand 10 and the pressure plate 20 as well as the hydraulic cylinders 1 and the guide element 30.

The upper part of FIG. 13 shows a front view of the tire curing press 100, namely, the lower area of the press with the stand 10 and the pressure plate 20 as well as the hydraulic cylinders 1 and the guide element 30. The lower part of FIG. 13 shows a cross-sectional view along line D-D of the upper part.

The invention claimed is:

1. A device for adjusting height of a mold of a tire curing press, in which the mold has at least two mold parts positionable relative to each other, wherein the device realizes a substantially linear adjusting movement, the device comprising: at least two hydraulic cylinders as a linear drive; at least one guide tubular element as a linear guide; a locking device corresponding to the guide element, wherein the locking device is configured so that the guide element is lockable in at least one axial position, wherein the locking device is formed by a ring, comprising at least one pin positioned and oriented relative to the guide element so that the ring is at least partially rotatable around the guide element by a swivel drive; and a sensor arranged to monitor the position of the ring.

2. The device according to claim 1, wherein the at least two hydraulic cylinders are oil-filled or water-filled hydraulic cylinders.

3. The device according to claim 1, wherein the at least two hydraulic cylinders are double-acting hydraulic cylinders.

4. The device according to claim 1, wherein the guide element comprises, on an outside surface, at least one longitudinal and transverse groove that is arranged so that the at least one pin of the ring engages in the longitudinal and transverse groove.

5. A tire curing press comprising a device according to claim 1.

6. The tire curing press according to claim 5, wherein four hydraulic cylinders are provided as a linear drive for adjusting the height of the mold.

7. The tire curing press according to claim 6, wherein the guide element is arranged centrally with respect to the hydraulic cylinders.

8. The tire curing press according to claim 5, wherein the guide element and the hydraulic cylinders are at least partially accommodated in structural openings in a machine bed.

9. The tire curing press according to claim 5, wherein a first mold half is formed by a pressure plate, which is movable to allow adjustment of the height of a mold by the device.

10. The tire curing press according to claim 9, wherein the pressure plate comprises an opening and a concentric recess, so that the guide element is connectable by connecting means to the pressure plate and the pressure plate centered relative to the guide element so that longitudinal and transverse forces are absorbed by the guide element.

11. The tire curing press according to claim 9, wherein the pressure plate is connected to the guide element so that a holding device for a green tire is passable centrally therethrough.

12. The tire curing press according to claim 5, wherein the hydraulic cylinders have piston rods that are connected by connecting means to the pressure plate so that longitudinal forces are transmittable and transverse movements are possible.

13. The tire curing press according to claim 5, wherein the connecting means reduce heat transfer from the pressure plate to the device.

14. A method for adjusting height of a mold of a tire curing press according to claim 1, comprising the steps of:
 (a) axially positioning the pressure plate using at least two hydraulic cylinders;
 (b) activating the locking device by a swiveling device, so that a lower mold half is locked axially in place;
 (c) monitoring the locking according to step (b) with at least one sensor to monitor a position of a ring; and
 (d) optionally turning off pressure to the at least two hydraulic cylinders when the lock monitoring according to step (c) reports that locking has been achieved.

15. A method for producing a tire using a tire curing press according to claim 1, comprising the steps of:
 (a) axially positioning the pressure plate using at least two hydraulic cylinders;
 (b) activating the locking device by a swiveling device, so that a lower mold half is locked axially in place;
 (c) monitoring the locking according to step (b) with at least one sensor to monitor a position of a ring;
 (d) optionally turning off pressure to the at least two hydraulic cylinders when the lock monitoring according to step (c) reports that locking has been achieved;
 (e) axially positioning green tire in the longitudinal direction of the tire curing press by way of the holding device;
 (f) lowering the upper mold half into a pressing position by a movement mechanism integrated into columns;
 (g) carrying out a tire production process by action of time, pressure, and temperature;
 (h) opening the tire curing press by the movement mechanism integrated into the columns by moving the upper mold half into an open position; and
 (i) removing the tire from the holding device by a removal device.

\* \* \* \* \*